(12) United States Patent
Sreemanthula et al.

(10) Patent No.: US 7,130,614 B2
(45) Date of Patent: Oct. 31, 2006

(54) MOBILE UNIT ATTACHMENT/UPDATE TO CELLULAR COMMUNICATION NETWORK

(75) Inventors: Srinivas Sreemanthula, Flower Mound, TX (US); Rene Purnadi, Coppell, TX (US)

(73) Assignee: Nokia Corporation, Espoo (FI)

( * ) Notice: Subject to any disclaimer, the term of this patent is extended or adjusted under 35 U.S.C. 154(b) by 510 days.

(21) Appl. No.: 10/231,191

(22) Filed: Aug. 30, 2002

(65) Prior Publication Data

US 2004/0203596 A1 Oct. 14, 2004

(51) Int. Cl.
*H04Q 7/20* (2006.01)
*H04Q 7/32* (2006.01)

(52) U.S. Cl. ............... 455/411; 455/422.1; 455/426.1; 455/445; 455/466; 455/414.1; 455/414.4; 455/432.1; 370/355; 370/352; 370/473; 370/338; 370/445

(58) Field of Classification Search ............ 455/432.1, 455/432.2, 432.3, 433, 434, 435.1, 435.3, 455/403, 414.1, 414.2, 414.4, 466, 445, 550.1, 455/500, 517, 436, 437, 438, 439, 440, 441, 455/442, 443, 444, 450, 451, 452.2, 453, 455/426.1, 426.2; 370/331, 355, 352, 473, 370/338, 445
See application file for complete search history.

(56) References Cited

U.S. PATENT DOCUMENTS 6,198,927 B1 * 3/2001 Wright et al. ............ 455/435.1
6,510,323 B1 * 1/2003 Stocker et al. ............ 455/466
6,535,493 B1 * 3/2003 Lee et al. .................. 370/329
6,826,414 B1 * 11/2004 Reynolds et al. ........... 455/555
2002/0031107 A1 3/2002 Li et al.

FOREIGN PATENT DOCUMENTS

EP 1 011 241 6/2000
EP 1 182 831 2/2002

OTHER PUBLICATIONS

R. Ramjee, et al: "HAWAII: A Domain-based Approach for Supporting Mobility in Wide-Area Wireless Netowrks", pp. 283-292.
3$^{rd}$ Generation Partners, 3G TR 21.905, Technical Report Jun. 2000, p. 88, verison 3.1.0 Release date 1999, 3GPP Organizational Partners (ARIB, CWTS, ETSI, TI, TTA, TTC).
P. Mutaf, C. Castelluccia, IP Paging Threat Analysis, Internet Draft, Feb. 2002, p. 17.
3$^{rd}$ Generation Partnership Project, CWTS STD-DS-25.401, Utran Overall Description, p. 42.
Kempf, et al., Requirements and Functional Architecture for an IP Host Alerting Protocol, Informational, Aug. 2001, p. 16, The Internet Society (2001).

(Continued)

*Primary Examiner*—Keith Ferguson
(74) *Attorney, Agent, or Firm*—Foley & Lardner, LLP

(57) ABSTRACT

A method for reducing IP level signaling and radio resource load during the attachment or update L3 of a mobile unit to a cellular wireless communication network is disclosed wherein access network elements and routing network elements are provided, an identification element is transmitted from the mobile unit to one of the access network elements. The identification element indicates a current attachment of the mobile unit to one of the routing network elements. The transmitted identification element is checked so as to determine whether the access network element is provided with a connection to the one routing network element.

68 Claims, 6 Drawing Sheets

OTHER PUBLICATIONS

Narten, et al., Neighbor Discovery for IP Verison 6 (IPv6), Standards Track, Dec. 1998, p. 93, The Internet Society (2001).
Kempf, Document Mode Host Alerting ("IP Paging") Problem Statement, Informational, Jun. 2001, p. 14, The Internet Society (2001).

Narten, et al, RFC2461, Neighbor Discovery for IP Version 6 (IPv6), Standards Track, Aug. 1996, p. 82.
Faccin, et al, Dormant Mode Handover Support in Mobile Networks, Internet Draft, Nov. 2001, p. 34, Seamoby Working Group.

* cited by examiner

MOBILE UNIT ATTACHMENT/UPDATE TO CELLULAR COMMUNICATION NETWORK

BACKGROUND OF THE INVENTION

1. Field of the Invention

The present invention relates to a method and/or system and/or system units and/a computer program product which are usable for attaching a mobile unit to a cellular wireless communication network. In particular, the present invention relates to method and/or system and/or system units and/a computer program product, which minimize the L3 or IP signaling load during attachment or update procedures to the cellular wireless communication network.

2. Description of the Prior Art

Recently, development of communication networks has made considerable progress. Among such communication networks, there is an increasing number of communication networks supporting mobility of the users having subscribed to the networks. A user is represented by a terminal unit or terminal node he uses for communication with a communication partner unit or node. Note that in general a communication partner node is of the same or a similar type than a terminal node, while "partner node" has only been chosen to illustrate that this is the destination or called node in communication. A terminal node/communication partner node may for example be a mobile phone, mobile laptop computer, a personal digital assistant (PDA) or the like. Nevertheless, a called communication partner node may also be a fixed terminal such as a personal computer PC or the like.

Currently, $3^{rd}$ generation communication networks, e.g. the Universal Mobile Telecommunication System (UMTS), are under development in $3^{rd}$ Generation Partnership Project (3GPP). In general, UMTS networks includes a core network, Universal Terrestrial Radio Access (UTRA) network (UTRAN), and user equipment (i.e. user terminal units). The UTRAN provides interfaces to the core network and radio interfaces to the user equipment. As commonly known, protocols used for these interfaces are arranged into so-called layers. For example, the radio (L2) interface protocol architecture comprises a data link layer comprising e.g. medium access control (MAC) and radio link control (RLC) sublayers, and radio resource control (RRC). Furthermore, also a network layer is provided. The architecture, design as well as the used protocols of the UMTS are commonly known to those skilled in the art and will thus not be described in further detail herein.

With the increasing spreading and acceptance of the Internet, a harmonization of communication networks arises in that communication networks, in particular wireless communication networks, tend to be compatible with the Internet. Thus there is a tendency to adopt the Internet Protocol IP also in communication networks other than the Internet. IP is a packet based protocol type which allows transmitting data via the network in so-called packets comprising a header (including routing information) and a payload. In the case of mobility supporting communication networks, IP is adopted in a mobility supporting version still compatible with IP "as such". For example, Mobile IPv4, Mobile IPv6 or Cellular IP protocol version exist.

Mobile IP specifications and definitions of common terms in this technical field can be found under http://www.ietf.org, retrieved from the Internet on Aug. 8, 2002.

There is developed a variety of wireless communication networks which support IP based communication, i.e. packet-switched networks supporting mobility of the users, such as GPRS, UMTS, Mobile IP (MIP) or the like.

In wireless cellular networks, user terminal units are able to perform communications with each other (for example within the same wireless cellular communication network) or with corresponding terminals of other networks (for example wired LANs, WLANs, fixed or mobile cellular communication networks and the like) via corresponding communication protocols. The general architecture of a wireless cellular network, for example IPv6 based, is commonly known and thus described only shortly. The key elements of a cellular access network are the user terminal units or nodes and cellular access points (CAP) with which the user terminal communicates over a wireless communication interface, e.g. radio based. A cellular access point (also referred to as base station) covers a specific area, which is referred to hereinafter as a cell. The size of a cell may vary in dependence of the environment, network operator specifications, number of associated subscribers and the like. The CAP is adapted to control communications of the user terminals within this cell, for example, by allocating frequency channels, establishing connections for the user terminals, forwarding data and the like. A user terminal is normally associated with one access point, which is referred to hereinafter as the serving CAP. A cellular access point can be associated to one or more access routers AR which routes the transmitted data via the cellular access points to and from the terminal node. Via a distribution network to which the cellular access points may be connected via the access router, communication connections between different cellular access networks or external networks (e.g. fixed networks, mobile telecommunications networks such as GSM, UMTS, WLAN and the like) can be established for a user terminal. Normally, for the communication control, the user terminal may be attached to the corresponding serving CAP via a L2 protocol and to the access router via a L3 or IP protocol.

For forwarding correctly data to and from the (mobile) user terminal, it is necessary that the network knows where the user terminal is located in the network. For this purpose, the user terminal is provided with addresses received by the respective network elements, such as the associated access point, the attached access router and the like. The addresses are registered, for example, in the home agent (HA) of the user terminal's home site. When the mobile user terminal is moved to another cell (i.e. another access point coverage area) it receives a new temporarily address which is called the Care-of-Address (CoA). When the user terminal knows the new CoA, it performs a so-called binding update procedure, e.g. a Mobile IPv6 binding update, with a corresponding network registering element, for example, with its HA. By means of this the CoA is mapped to the "permanent" address of the user terminal so as to ensure the reachability of the user terminal in the network.

A further development in the field of IP based communication networks is known as Hierarchical Mobile IP (HMIP). In this solution, a further network element is provided which is called Mobile Anchor Point (MAP). This MAP is used as a mobility agent for supporting mobility management of the user terminal in the network, e.g. in case of handovers.

In IP based communication networks, in particular in an IPv6 based network, a procedure known as Neighbor Discovery is performed. Neighbor Discovery is a commonly known concept and is described in further detail, for example, in the Internet Engineering Task Force (IETF) Requests For Comments (RFC) 1970 and 2461. In short, nodes (hosts and routers) use Neighbor Discovery to determine the link-layer addresses for neighbors known to reside on attached links and to quickly purge cached values that become invalid. Hosts also use Neighbor Discovery to find neighboring routers that are willing to forward packets on their behalf. Finally, nodes use the protocol to actively keep track of which neighbors are reachable and which are not, and to detect changed link-layer addresses. When a router or the path to a router fails, a host actively searches for functioning alternates.

According to the IPv6 Neighbor Discovery, the AR sends periodic Router Advertisements via the access points to user terminals, which are also designated as mobile nodes MN. That means, routers advertise their presence together with various link and Internet parameters periodically (or in response to a Router Solicitation message). The Router Advertisements comprise prefixes that are used, e.g., for on-link determination and/or address configuration.

The MN listens to the Router Advertisements. In the case that a new prefix is advertised, the MN determines that the network layer attachment has changed (i.e. the attachment to the AR) and computes a new CoA based on the new AR prefix (from the new AR) and then performs MIPv6 binding procedures.

However, IPv6 Neighbor Discovery, as well as MIPv6 procedures in general, affects spectrum efficiency of wireless communication networks. Particularly, for all messages concerning the network attachment (i.e. L3 messages) a radio bearer has to be established between the MN and the network. This requires the establishment of expensive traffic channels.

In FIGS. 5 and 6 a part of a cellular wireless communication network is shown for illustrating different Neighbor Discovery situations. In general, when the MN is for example L2 dormant (i.e. a state in which the MN restricts its ability to receive normal IP traffic by reducing monitoring of radio channels, which allows the MN to save power and reduces signaling load on the network), it "wakes up" after specific periods of time to perform periodic routine functions, for example to monitor paging channel (PCH) and for periodic L2 updates depending on the CELL_PCH or the URA_PCH (URA: UTRAN Registration Area) dormancy levels. However, every time it performs an L2 update, for radio efficiency reasons, the AP must also send (or allow from AR) the L3 network information to provide the current network attachment information, like the Router Advertisement. If the information is different from current network attachment in the MN, the MN obtains a new CoA and performs MIPv6 Binding Updates to all the mobility agents like HA and/or MAP (if HMIP is used).

Referring to FIG. 5, we assume a case where MN (i.e. MN1) has a network attachment (CoA) previously from an AR (in FIG. 5, AR1). That means, that the original Cellular Access Point CAP1 has provided the MN1 with the Router Advertisement of AR1, and the MN has a CoA from AR1 and performs a corresponding binding update for mapping this CoA at its HA. Thereafter, e.g. after a specific period of time, the MN1 may go L2 dormant. The MN1 can become L2 dormant in either cell level (CELL_PCH) or RRA (Radio Resource Allocation) level (URA_PCH). When the MN1 moves from one cellular Access Point CAP1 to another CAP2, as shown in FIG. 5, if it is in the CELL_PCH dormant state, it will perform cell updates. At the same time, the new CAP2 must allow the MN1 to receive a Router Advertisement to check its latest network attachment. In the case that the new CAP2 belongs to a different AR (not shown) a different network prefix is sent and an attachment procedure is performed. However, in the other case, in which the new CAP2 belongs to the same network coverage as the previous CAP1 to which the MN1 was associated before (as shown in FIG. 5), there is also established a Radio Bearer to provide the MN1 with the Router Advertisement (i.e. the prefix of AR1). The same situation applies to URA_PCH state, only that the MN wakes up only when it changes the cells at the RRA level, while the rest of the procedure remains the same.

In a more complex network scenario, such as shown in FIG. 6, where there may be many-to-many relation between different CAP (CAP1, CAP2) and AR (AR1, AR2, AR3), the situation becomes also more complex. Again, MN1 is provided with the Router Advertisement of AR1 by the CAP1, has performed the binding update, and may be gone to L2 dormant state. When the MN1 moves from its original CAP1 area to a new CAP2 area, the CAP2 could theoretically selectively provide one (or more) optimum Router Advertisements to the MN1. However, due to efficiency reasons, the CAP2 is not adapted to provide Router Advertisements from every AR it is connected to. Thus, the new CAP2 selects one of the connected AR (e.g. AR3) of which the Router Advertisement is sent to the MN1, which in turn performs the described attachment procedure.

This existing scheme is in particular problematic with regard to radio resources. As described above, for the provision of the network attachment information (L3), a Radio Bearer has to be established. In the case of FIG. 5, it is actually unnecessary for the MN to receive the Router Advertisements of the AR1. The problem is not just to send the Router Advertisement, but also to send it over the default Radio Bearer, which must be established if the MN1 was L2 dormant. In the case of FIG. 6, even though the CAP2 also belongs to the same AR that the MN was originally connected to (i.e. AR1), the CAP2 must provide a new Router Advertisement from any of AR1, AR2 or AR3 after establishing a new default Radio Bearer. The problem amplifies when the MN receives the new Router Advertisement, for example, of AR3. Then MN1 has to reconfigure a new CoA and perform all the MIPv6 binding procedures, while there was actually no need for this. Thus, this mechanism is a drain on the MN power and also very inefficient on radio resources.

One approach to reduce the signaling load in IP based communication networks is the so-called IP Dormancy/Paging, which is described, for example in IETF RFC 3154 and RFC 3132. However, this approach is still vague and will increase the network complexity of the network due to the involved paging network architecture.

SUMMARY OF THE INVENTION

Thus, it is an object of the present invention to provide an improved method and/or system and/or system units and or a computer program product for attaching a mobile unit to a wireless communication network.

Furthermore, it is an object of the present invention to provide a method and/or system and/or system units and/or a computer program product, which save network unit resources and/or network radio resources.

Moreover, it is an object of the present invention to provide a method and/or system and/or system units and or a computer program product, which are usable for minimizing signaling load during an attachment/update procedure to the wireless communication network.

These objects are achieved, for example, by a method of attaching/updating a mobile unit to a cellular wireless communication network, said cellular wireless communication network comprising a plurality of access network elements, each of which covering a respective cell area in said cellular wireless communication network, wherein said mobile unit is attached to one of said plurality of access network elements, and a plurality of routing network elements for forwarding data transmitted via said plurality of access network elements to and from said mobile unit, each of said routing network elements being connected with at least one of said plurality of access network elements, wherein said mobile unit is attached to one of said plurality of routing network elements, said method comprising the steps of initializing an attachment/update procedure of said mobile unit to one of said plurality of access network elements, transmitting from said mobile unit to said one of said plurality of access network elements an identification element indicating the current attachment of said mobile unit to said one of said plurality of routing network elements, and checking said transmitted identification element so as to determine whether said one of said plurality of access network elements is provided with a connection to said one of said plurality of routing network elements.

According to a further refinement of the method, the method may comprise a step of measuring and determining whether a network status for the connection of the mobile unit to said one of said plurality of routing network elements is sufficient or not.

According to still further refinements of the method the step of initializing said attachment/update procedure may be performed when said mobile unit moves from one cell area to another cell area covered by said one of said plurality of access network elements, and/or the step of initializing said attachment/update procedure may be performed when the network status for the connection of said mobile unit to said one of said plurality of routing network elements is not sufficient.

In still further refinements of the method, the step of checking said transmitted identification element may comprise a step of comparing said transmitted identification element with identification elements of the routing network elements to which said one of said plurality of access network elements is connected;—when said comparing steps results that said transmitted identification element and said identification elements of the routing network elements to which said one of said plurality of access network elements is connected match, said method further may comprise the step of completing the attachment/update procedure between said mobile unit and said one of said plurality of access network elements while the attachment of said mobile unit to said one of said routing network elements is retained unaffected;

when said comparing steps results that said transmitted identification element and said identification elements of the routing network elements to which said one of said plurality of access network elements is connected match, said method may further comprise the steps of measuring and determining whether a network status for the connection of the mobile unit to said one of said plurality of routing network elements is sufficient or not, and when said network status is sufficient, completing the attachment/update procedure between said mobile unit and said one of said plurality of access network elements (CAP2) while the attachment of said mobile unit to said one of said routing network elements is retained unaffected;

when said comparing steps results that said transmitted identification element and said identification elements of the routing network elements to which said one of said plurality of access network elements is connected match, said method further comprises the steps of measuring and determining whether a network status for the connection of the mobile unit to said one of said plurality of routing network elements is sufficient or not, and when said network status is not sufficient, establishing a radio bearer between said one of said plurality of access network elements and said mobile unit, providing said mobile unit with the identification element of another routing network element to which said one of said plurality of access network elements is connected, reconfiguring the attachment of said mobile unit to the new routing network element indicated by said provided identification element and performing a binding update procedure in said cellular wireless communication network, completing the attachment/update procedure between said mobile unit and said one of said plurality of access network elements, and tearing down the radio bearer upon completion of the attachment/update procedure;

the identification element may be transmitted from said mobile unit to said one of said plurality of access network elements by a location update procedure signaling;

the identification element may be transmitted from said mobile unit to said one of said plurality of access network elements by a separate message when moving into the cell area of said one of said plurality of access network elements;

Alternatively, as a further refinement of the method, the step of initializing said attachment/update procedure may be performed when a predetermined period of time is expired while said mobile unit remains in the same cell area; and if this is the case;

the step of checking said transmitted identification element may comprise the steps of recognizing said transmitted identification element as an indication that said mobile unit is attached to one of said plurality of routing network elements to which said one of said plurality of access network elements is connected, measuring and determining whether a network status for the connection of the mobile unit to said one of said plurality of routing network elements is sufficient or not, and when said network status is not sufficient, establishing a radio bearer between said one of said plurality of access network elements and said mobile unit, providing said mobile unit with the identification element of another routing network element to which said one of said plurality of access network elements is connected, reconfiguring the attachment of said mobile unit to the new routing network element indicated by said provided identification element and performing a binding update procedure in said cellular wireless communication network, completing the attachment/update procedure between said mobile unit and said one of said plurality of access network elements and tearing down the radio bearer upon completion of the attachment/update procedure;

the step of checking said transmitted identification element may comprise the steps of recognizing said transmitted identification element as an indication that said mobile unit is attached to one of said plurality of routing network elements to which said one of said plurality of access network elements is connected, measuring and determining whether a network status for the connection of the mobile unit to said one of said plurality of routing network elements is sufficient or not, and when said network status is sufficient, completing the attachment/update procedure between said mobile unit and said one of said plurality of access network elements while the attachment of said mobile unit to said one of said routing network elements is retained unaffected;

the step of checking said transmitted identification element may comprise the steps of recognizing said transmitted identification element as an indication that said mobile unit is attached to one of said plurality of routing network elements to which said one of said plurality of access network elements is connected, measuring and determining whether a network status for the connection of the mobile unit to said one of said plurality of routing network elements is sufficient or not, and when said network status is not sufficient, establishing a radio bearer between said one of said plurality of access network elements and said mobile unit, providing said mobile unit with the identification element of another routing network element to which said one of said plurality of access network elements is connected, reconfiguring (S140) the attachment of said mobile unit to the new routing network element indicated by said provided identification element and performing a binding update procedure in said cellular wireless communication network, completing the attachment/update procedure between said mobile unit and said one of said plurality of access network elements and tearing down the radio bearer upon completion of the attachment/update procedure;

the transmitted identification element may be a flag indicating that the attachment of said mobile unit to said one of said plurality of routing network elements is to be retained.

Furthermore, these objects are achieved, for example, by a corresponding system for attaching/updating a mobile unit to a cellular wireless communication network, said cellular wireless communication network comprising a plurality of access network elements, each of which covering a respective cell area in said cellular wireless communication network, wherein said mobile unit is attached to one of said plurality of access network elements, and a plurality of routing network elements for forwarding data transmitted via said plurality of access network elements to and from said mobile unit, each of said routing network elements being connected with at least one of said plurality of access network elements, wherein said mobile unit is attached to one of said plurality of routing network elements, said system comprising means adapted to transmit, when an attachment/update procedure of said mobile unit to one of said plurality of access network elements is initialized, an identification element to said one of said plurality of access network elements, which identification element indicating the current attachment of said mobile unit to said one of said plurality of routing network elements, and means adapted to check said transmitted identification element so as to determine whether said one of said plurality of access network elements is provided with a connection to said one of said plurality of routing network elements.

Furthermore, these object are achieved, for example, by a corresponding mobile unit being attachable to a cellular wireless communication network, said cellular wireless communication network comprising a plurality of access network elements, each of which covering a respective cell area in said cellular wireless communication network, wherein said mobile unit is attached to one of said plurality of access network elements, and a plurality of routing network elements for forwarding data transmitted via said plurality of access network elements to and from said mobile unit, each of said routing network elements being connected with at least one of said plurality of access network elements, wherein said mobile unit is attached to one of said plurality of routing network elements, said mobile unit comprising means adapted to transmit, when an attachment/update procedure of said mobile unit to one of said plurality of access network elements is initialized, an identification element to said one of said plurality of access network elements, which identification element indicating the current attachment of said mobile unit to said one of said plurality of routing network elements.

Moreover, these objects are achieved, for example, by a corresponding access network element of a cellular wireless communication network to which a mobile unit is attachable, said cellular wireless communication network comprising a plurality of access network elements, each of which covering a respective cell area in said cellular wireless communication network, wherein said mobile unit is attached to one of said plurality of access network elements, and a plurality of routing network elements for forwarding data transmitted via said plurality of access network elements to and from said mobile unit, each of said routing network elements being connected with at least one of said plurality of access network elements, wherein said mobile unit is attached to one of said plurality of routing network elements, said access network element comprising means adapted to means adapted to check, when an attachment/update procedure of said mobile unit to said network element is initialized, an identification element transmitted from said mobile unit to said access network element, which identification element indicating the current attachment of said mobile unit to said one of said plurality of routing network elements, wherein it is determined whether said access network element is provided with a connection to said one of said plurality of routing network elements.

Furthermore, these objects are achieved, for example, by a corresponding computer program product usable for data processing devices, comprising software code portions for performing the steps of the method defined above when said product is run on said data processing devices.

According to further refinements of the computer program product, the computer program product may comprise a medium readable by said data processing device, on which said software code portions are stored;

the computer program product may be directly loadable into an internal memory of said data processing devices;

the computer program product may be executed in a data processing device of a mobile unit and a data processing device of an access network element.

According to a further refinement, the cellular wireless communication network may be an IP based network, preferably an IPv6 based network, wherein said mobile unit is a mobile node, said access network elements are cellular access points, and said routing network elements are access routers. Additionally, the proposed attachment/updating may be executed in connection with a L3 or IP attachment/updating.

The basic concept is to increase the role of Access Points during attachment/update procedures in order to save radio resources. In the process the AP may act as a proxy for some of the IPv6/MIPv6 functions in the network.

By virtue of the present invention, the following advantages can be achieved:

- Radio resources are saved due to the reduced signaling load. The mobile hosts (i.e. the mobile user terminals or mobile nodes) receive fewer and optimized Router Advertisements that indicate the change in network reachability at L3. This results in an efficient radio resource utilization.
- Power on the MN side is saved. The MN must not establish L3 connection to receive these L3 updates every time it moves to another CAP area. For example, a default Radio Bearer establishment is not necessary and the MN has to perform only L2 procedures and can go back thereafter to L2 dormancy state.
- The effect is achieved without the need of a more complex network architecture and/or functionality. For example, the implementation of IP Dormancy/Paging functions for this purpose is not required to provide this efficiency.

The method and/or system and/or system units and/or computer program product of the invention are in particular useful in the following situations:

- when there is an idle handoff (i.e. when the MN is turned on but there is no RRC connection established);
- when there is an initial IP cellular network roll-out, when only a few AR sites exists and the signaling load is to be as low as possible;
- when there is a one to many AR to CAP relation, since unnecessary network attachments are avoided;
- when the MN stays in the same AR area for an extended time period and has to perform many URA/Cell updates.

The proposed attachment mechanism will provide an overall efficient procedure to keep the network reachability alive without the overhead of unnecessary messages, such as unnecessary L3 messages. It also reduces the need for IP paging and the IP paging architectures.

The above and still further objects, features and advantages of the invention will become more apparent upon referring to the description and the accompanying drawings.

DESCRIPTION OF PREFERRED EMBODIMENTS

A best mode for realizing the invention is described in connection with FIGS. 1 to 4.

Figure 1:
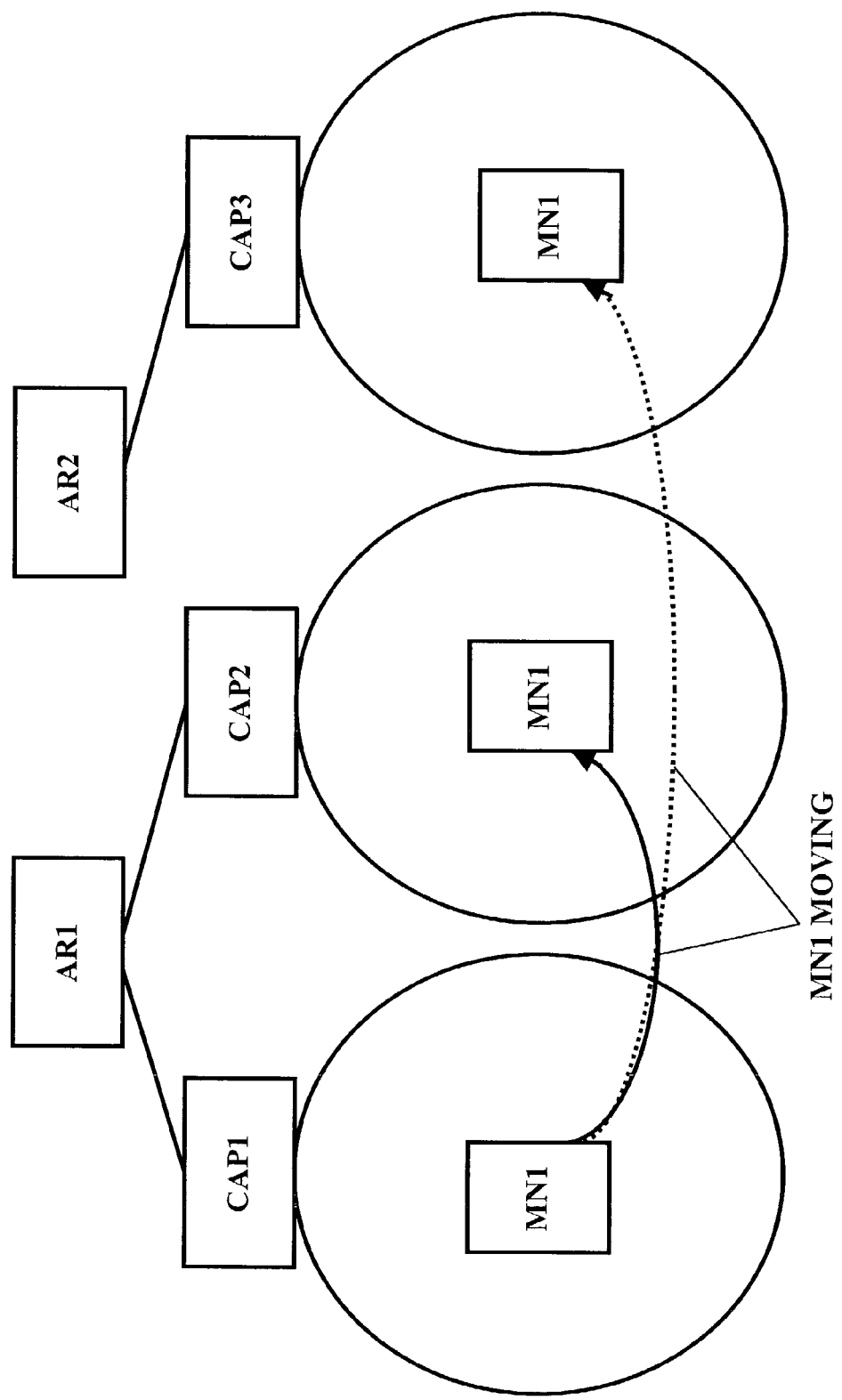
FIG. 1 shows a diagram of a system of a cellular access network and access routers for illustrating an application of an attachment and update procedure.

In FIG. 1, a cellular access network part for illustrating an application of the attachment/update procedure, in particular a L3 or IP attachment/update procedure, is shown. In this example, an IPv6 based network environment is used. According to FIG. 1, the cellular access network comprises a plurality of cellular access points CAP1, CAP2, CAP3, representing access network elements, each of which covering a respective cell area which form the network. A mobile node MN1 representing a mobile user terminal is located in the network and associated with (attached to) one of the CAPs, for example CAP1. Furthermore, FIG. 1 comprises a plurality of access routers AR1, AR2 representing routing network elements, which are provided to route data transmitted to and from the MN1 in the network. Each of the access routers AR1, AR2 may be connected with at least one of the CAPs. In this example, AR1 is connected with CAP1 and CAP2, while AR2 is connected with CAP3. As described above, the MN1 is provided with a cell/routing area attachment, i.e. with an attachment to the respective serving CAP (L2), and with a network attachment, i.e. for example, with an attachment to a respective AR (L3). As a start situation, in the example shown in FIG. 1, MN1 is attached to CAP1 and to AR1. Moreover, a (not shown) home agent HA or a mobile anchor point MAP, depending on the chosen network architecture, which serves as a mobility agent for the MN1, may be provided as an extension which is known for persons skilled in the art.

It is obvious that the cellular access network may comprise more access points and that more access routers than those shown may be provided. Furthermore, it is evident that in the cellular access network more than one MN can be located.

As shown in FIG. 1 by arrows, the MN1 is adapted to be movable within the network environment. That means that the MN1 can move from the cell area of its original CAP1 to one of the other CAPs, i.e. to CAP2 or CAP3. In dependence of where the MN1 is moving, attachment/update procedures to the respective new CAP and/or to a new AR are to be performed. This will be described later in grater detail.

Irrespective of its specific type (e.g. personal computer, mobile phone, PDA and the like) the mobile node MN1 may comprise several means (not shown) which are required for its communication functionality and which are known to those skilled in the art. Such means are for example a processor unit for executing instructions and processing data for the communication connection (e.g. transmission content and signaling related data), memory means for storing instructions and data, for serving as a work area of the processor and the like (e.g. ROM, RAM, EEPROM, and the like), input means for inputting data and instructions by software (e.g. floppy diskette, CD-ROM, EEPROM, and the like), user interface means for providing monitor and manipulation possibilities to a user (e.g. a screen, a keyboard, a microphone and headset for communication, and the like), and network interface means for establishing a communication connection under the control of the processor unit (e.g. and wireless interface means, an antenna, and the like). These means can be integrated within one device (e.g. in case of a mobile telephone) or in several devices forming the subscriber terminal (e.g. in case of a personal computer).

Similarly, a cellular access point comprises several means (not shown) which are required for its communication functionality and which are known to those skilled in the art. Such means are for example a processor unit for executing instructions and processing data for the communication connection (e.g. transmission forwarding and signaling related data), memory means for storing instructions and data, for serving as a work area of the processor and the like (e.g. ROM, RAM, EEPROM, and the like), input means for inputting data and instructions by software (e.g. floppy diskette, CD-ROM, EEPROM, and the like), user interface means for providing monitor and manipulation possibilities to a user (e.g. a screen, a keyboard, and the like), network interface means for establishing a communication connection with subscriber terminals under the control of the processor (e.g. and wireless interface means, an antenna, and the like), interface means for communicating via a backbone network with other access points/access routers under the control of the processor unit, and the like. Besides a dedicated communication connection with a user terminal, the access point is adapted to transmit signaling data within its cell, which enables to determination of connection quality information related to this access point. This may be performed by means of a beacon frame, which is sent permanently or in specific intervals. (A similar structure is also provided for access routers.)

A general overview of an attachment and update procedure performed in the system shown in FIG. 1 is described in connection with FIGS. 2 and 3.

As mentioned above, the MN1 is already attached to the CAP1 and to the AR1. This means that the MN1 is provided with a CoA of AR1 (network attachment to AR1, provided with AR1 prefix) and has completed a corresponding binding update with its HA or MAP (depending on the network architecture used). After starting the attachment/update procedure (step S10) the MN1 checks whether the location has been changed (step S20). In other words, the MN1 determines, for example in its processor unit on the basis of information received from the beacon signals or frames sent by the respective CAPs, whether it has entered the coverage area of another CAP (CAP2 or CAP3). This determination can be based, for example, on recognized changes in the CELL_ID or the URA_ID received from the CAP. Moreover, the decision to change the CAP can be based on commonly known radio resource management, handover or roaming criteria, such as received signal strength or the like. As also commonly known, this determination can be performed in different states of the MN1, e.g. idle state, non-idle state, connected state and the like.

When the determination in step S20 results that the MN1 has been moved away from the original CAP1 cell area (YES in step S20), step S70 (FIG. 3) follows.

In step S70, an attachment update procedure, for example a cell update or a URA update, to the CAP of the entered cell area is initialized. During this attachment/update procedure, in step S80, the MN1 sends an identification element to the new CAP (CAP2 or CAP3) which indicates the current network (AR) attachment of the MN1, i.e. the attachment to AR1. This may be done by sending the access router prefix, which may have been provided by the CAP1 or directly by AR1. The sending of the identification element is effected, for example, by means of the processor unit of the MN1.

The identification element, for example the prefix of AR1, is received by the new CAP in connection with the signaling transmitted for the attachment update of the MN1 to the new CAP (location update). In step S90, the new CAP checks the received identification element, e.g. by means of its processor unit, with regard to the identification element or elements which may be provided from the access router(s) to which the new CAP is connected itself. Also this/these identification element(s) may be the respective AR prefix(es) which is/are sent to the new CAP from the AR beforehand and stored in CAP in a suitable memory.

Alternatively, for obtaining the identification element(s), the new CAP may inform the MN1 to send a Router Solicitation in order to request the AR to generate a Router Advertisement immediately. As a further alternative, the new CAP could also send a proxy Router Solicitation to the AR so that the AR is forced to send a unicast Router Advertisement.

In step S100 it is determined in the CAP, whether there exists a match between the identification element received from the MN1 and at least one of the stored/received identification element(s). This determination may be based, for example, on a comparison between the respective AR prefixes. Referring back to FIG. 1, when the MN1 moves to the cell area of CAP2, the determination results that there is at least one match (YES in step S100). As can be seen in FIG. 1, CAP1 and CAP2 are connected to the same AR1. In other words, the network attachment of the MN1 can be retained and a network attachment update is not necessary.

When the determination performed in connection with step S100 indicates a match between the AR prefixes, a step S105 may be performed in which a network status reason for a new attachment to another AR is checked. This step S105 may be performed on the CAP side by means of known network measurements. Namely, when, for example, a failure of the CAP/AR connection occurs or when network congestion and load along the existing network connections of the MN1 are recognized (e.g. by the CAP), the new CAP may determine that the network status, for example the availability of the "old" AR or the current transmission capability of the "old" AR (due to traffic load) is not sufficient (it is to be noted that the decision whether the network status is sufficient or not is based, for example, on respective threshold levels predetermined by the network operator, or the like, which are compared with the respective network measurement results). When the determination of the network status results that it is not sufficient, the CAP is adapted to force a change of the AR (and eventually also of the CAP) attachment of the MN1 even though the present AR (AR1) would, in principle, still be reachable. This "compulsory measure" can be initiated, for example, by the new CAP (CAP2) by means of respective signaling to the MN1. When the determination in step S105 results that a network status reason is present, an attachment update of the MN1 to a new AR (and eventually to a new CAP, if the present CAP (CAP2) is only connected to the insufficient AR) is forced. (It is to be noted that an attachment to a new CAP (when no connection of present CAP with "sufficient" AR) results in an processing starting at step S70.)

When both the match determination (YES in step S100) and the network status determination (NO in step S105) results that network attachment of the MN1 can be retained, step S110 follows. In step S110, the cell update or URA update between the MN1 and the new CAP2 is completed, while any network update procedures are not initialized. This can be signaled to the MN1, for example, by providing corresponding information, which indicates the allowance for retaining the network attachment, in the cell update procedure, or simply by the missing of any Router Advertisement which would be required for the AR attachment. After the completion of the attachment update to the new CAP2, the procedure may start again. At the end of this attachment, the MN1 is attached to the CAP2 and retains its attachment to the AR1 unchanged. This means that no Radio bearer is to be established or binding update is to be performed.

On the other hand, referring back to FIG. 1, when the MN1 moves to the cell area of CAP3, the determination in step 100 results that there is no match between the identification element received from the MN1 and the stored/received identification element(s) (NO in step S100). As shown in FIG. 1, CAP3 is connected to AR2, and thus only the AR2 prefix is present in CAP3. Therefore, the CAP3 (i.e. its processor unit) decides that a network update of the MN1 is necessary. For this purpose, the CAP3 establishes a default Radio Bearer to the MN1 (step S120) and provides it with the respective identification element, i.e. the AR2 prefix (step S130). The MN1 receives and processes the AR2 prefix and recognizes that the network attachment has also to be updated. Thus, the attachment to the AR2 is reconfigured on the network layer by the MN1 in the known manner, called Stateless Address Auto-configuration, and a binding update with the HA or MAP is performed so as to inform the HA or MAP about the new CoA of the AR2 (step S140). When this is performed, the attachment/update procedure is completed (step S150), and the radio bearer is torn down upon completion of the attachment/update procedure. This means, that the MN1 is now attached to the CAP3 at the radio network layer and to the AR2 at the IP network level. Thereafter, the attachment/update procedure can be repeated.

Steps S120 to S150 may also be performed when step S105 results that there are such network status reasons that the network attachment of MN1 to the present AR (or the present CAP) is to be changed (NO in step S105). This means, that a network status is determined such that the AR connection is judged to be insufficient, for example due to an AR overload, an AR failure during an L2 dormant state of the MN1, or the like).

Referring back to FIG. 2, when the determination performed in connection with step S20 indicates that the MN1 is still in the same CAP1 covered cell area (NO in step S20), it may be checked whether a (not shown) timer (e.g. a L2 dormancy timer) in the MN1 is expired (step S30). Namely, the MN1 may be adapted to periodically perform cell or URA updates even if the location is not changed. The timer expiry may be indicated to the processor unit of the MN1 by a corresponding trigger signal. The timer may be reset after every attachment and/or update completion.

When the timer is not expired (NO in step S30), the attachment and update procedure is restarted. On the other hand, when the timer is expired (YES in step S30), the MN1 initialize the attachment update to the CAP1 (step S40). Since no cell change is recognized (e.g. same CELL_ID) and due to the fact that the attachment is to be performed due to the timer expiry, the MN1 (i.e. its processor unit) knows that the network attachment of the MN1 has not been changed. Thus, also in this case any network attachment related processing can be omitted. This is signaled to the CAP1 by transmitting, for example, a flag and a corresponding identification element (step S50). This identification element includes the flag which informs the CAP1 (implicitly) that the MN1 was already attached to CAP1 and thus to the AR1 connected to the CAP1. Optionally, the AR1 prefix without a flag may be sent, which is followed by the procedure starting at step S90 in FIG. 3 and the subsequent steps (not shown).

The CAP1 (e.g. its processor unit) recognizes this identification element as indicating the described situation (not shown). Then, step S55 is performed, in which a network status reason for the attachment is checked. This step S55 is similar to step S105 described above. This step S55 may be performed on the CAP side by means of known network measurements on the basis of an identification element (e.g. the transmitted one) of the attached AR. Namely, when, for example, a failure of the CAP/AR connection occurs or when network congestion and load along the existing network connections of the MN1 are recognized (e.g. by the CAP), the CAP (CAP1) may determine that the network status, for example the availability of the "old" AR or the current transmission capability of the "old" AR (due to traffic load) is not sufficient (it is to be noted that the decision whether the network status is sufficient or not is based, for example, on respective threshold levels predetermined by the network operator, or the like, which are compared with the respective network measurement results). When the determination of the network status results that it is not sufficient (YES in step S55), the CAP is adapted to force a change of the AR (and eventually also of the CAP) attachment of the MN1 even though the present AR (AR1) would, in principle, still be reachable. This "compulsory measure" can be initiated, for example, by the CAP (CAP1) by means of respective signaling to the MN1. Hence, when the determination in step S55 results that a network status reason is present (network status is determined such that the AR connection is judged to be insufficient, for example due to an AR overload, an AR failure during an L2 dormant state of the MN1, or the like), an attachment update of the MN1 to a new AR (and eventually to a new CAP, if the present CAP (CAP1) is only connected to the insufficient AR) is forced. This is executed according to steps S120 to S150 in FIG. 3. (It is to be noted that an attachment to a new CAP (when no connection of present CAP with "sufficient" AR) results in an processing starting at step S70 (not shown).)

On the other hand, when the determination in step S55 results, that there is no network status reason, i.e. that the network status is judged to be sufficient (NO in step S55), the update between the MN1 and the CAP1 (i.e. cell update or URA update) is completed (step S60), while the network attachment retains unchanged. Also in this case, no Radio bearer is to be established or binding update is to be performed.

Figure 2:
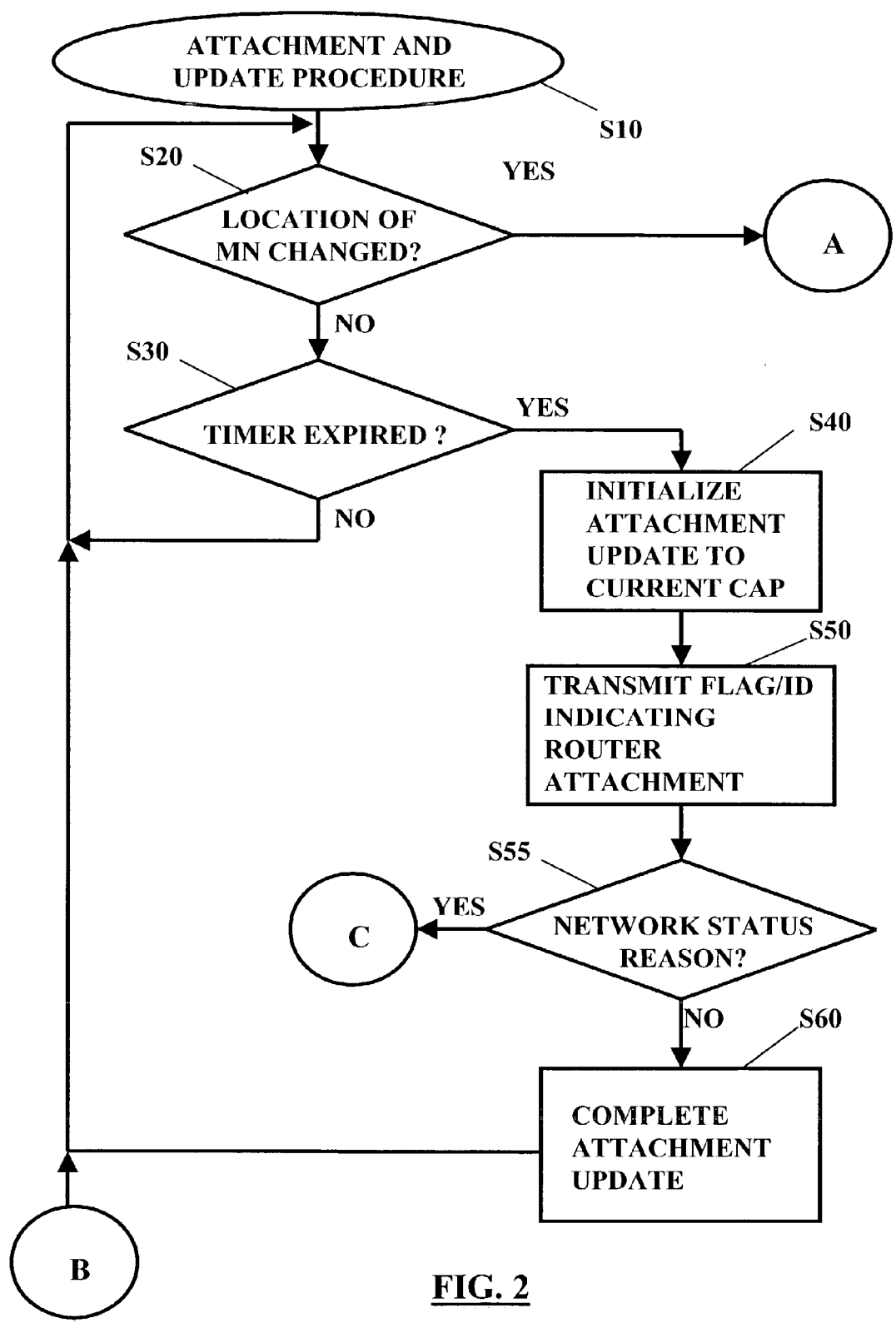
FIGS. 2 and 3 show a flow chart of an attachment and update procedure in the system according to FIG. 1.
Figure 3:
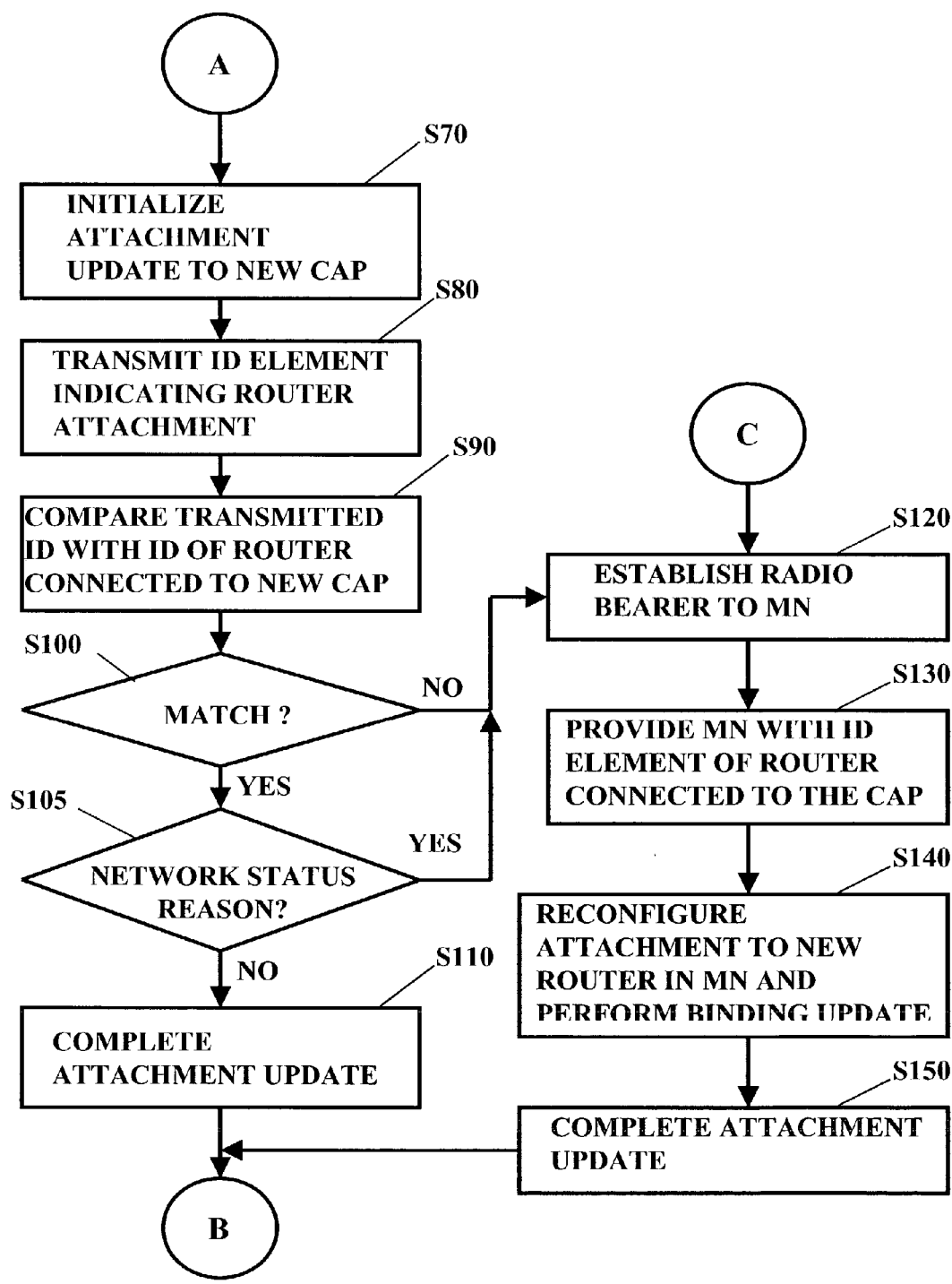

The above attachment and update mechanism will further be described in connection with FIG. 4 in which a diagram for illustrating the sequence and message flow in the attachment and update procedure steps according to FIGS. 2 and 3 is shown.

As mentioned above, as a starting situation, the MN1 is attached to CAP1 and AR1 which is in turn connected to CAP1. That means that the MN1 has a CoA of AR1 (network attachment) which is indicated or bound to the HA (or MAP) of MN1 by means of an executed binding update (BU).

Figure 4:
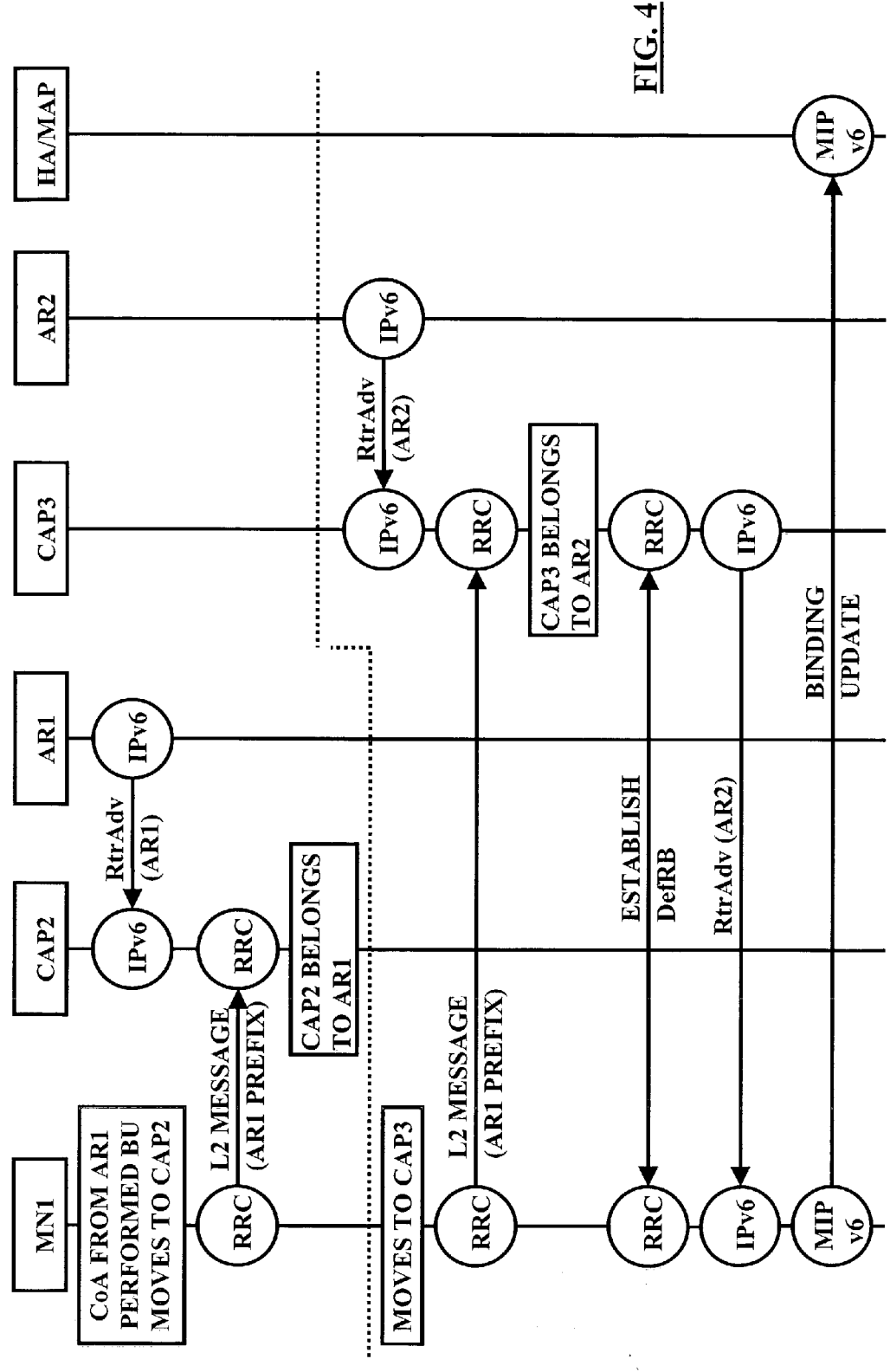
FIG. 4 shows a diagram illustrating an attachment/update procedure in the system according to FIG. 1.
Figure 5:
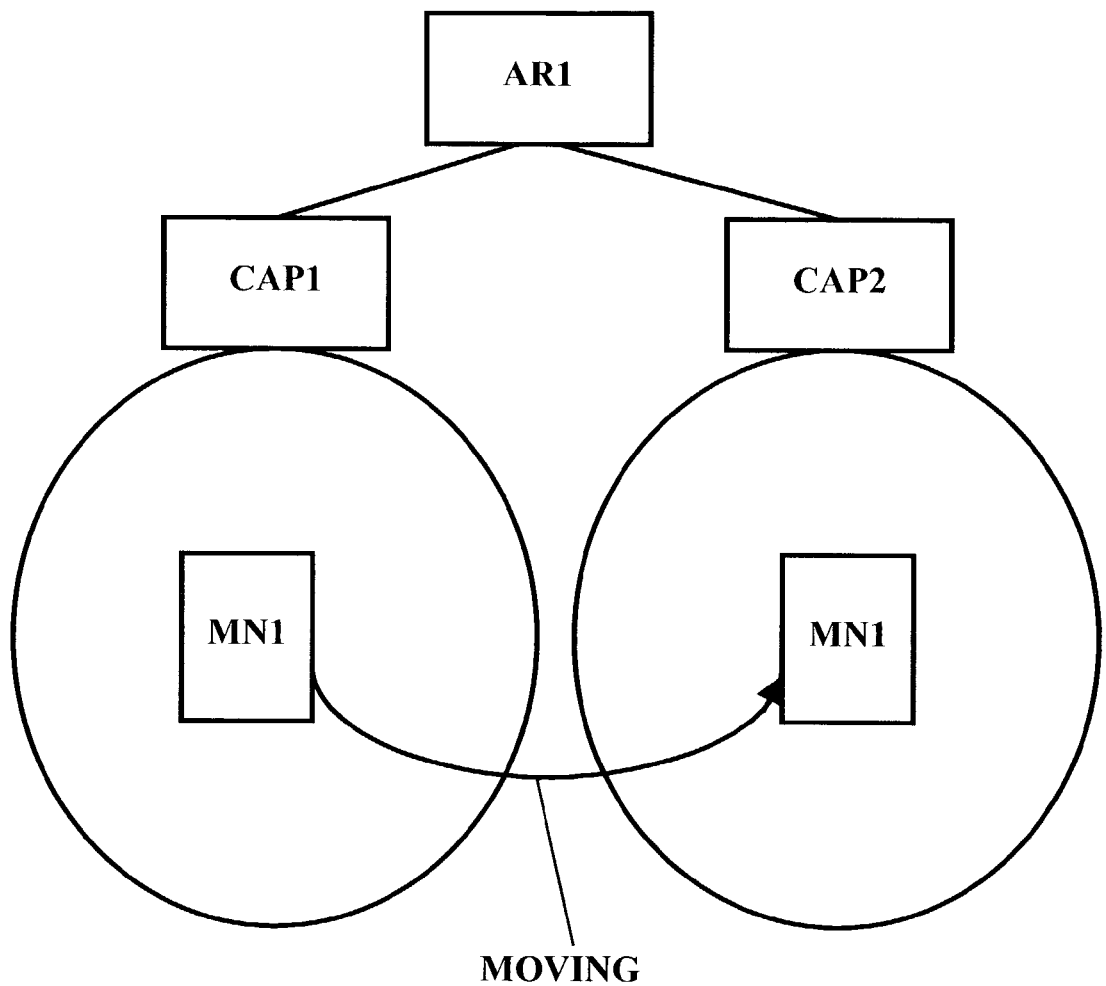
FIG. 5 shows a diagram of a system of a cellular access network and access router for illustrating an attachment procedure according to the prior art.
Figure 6:
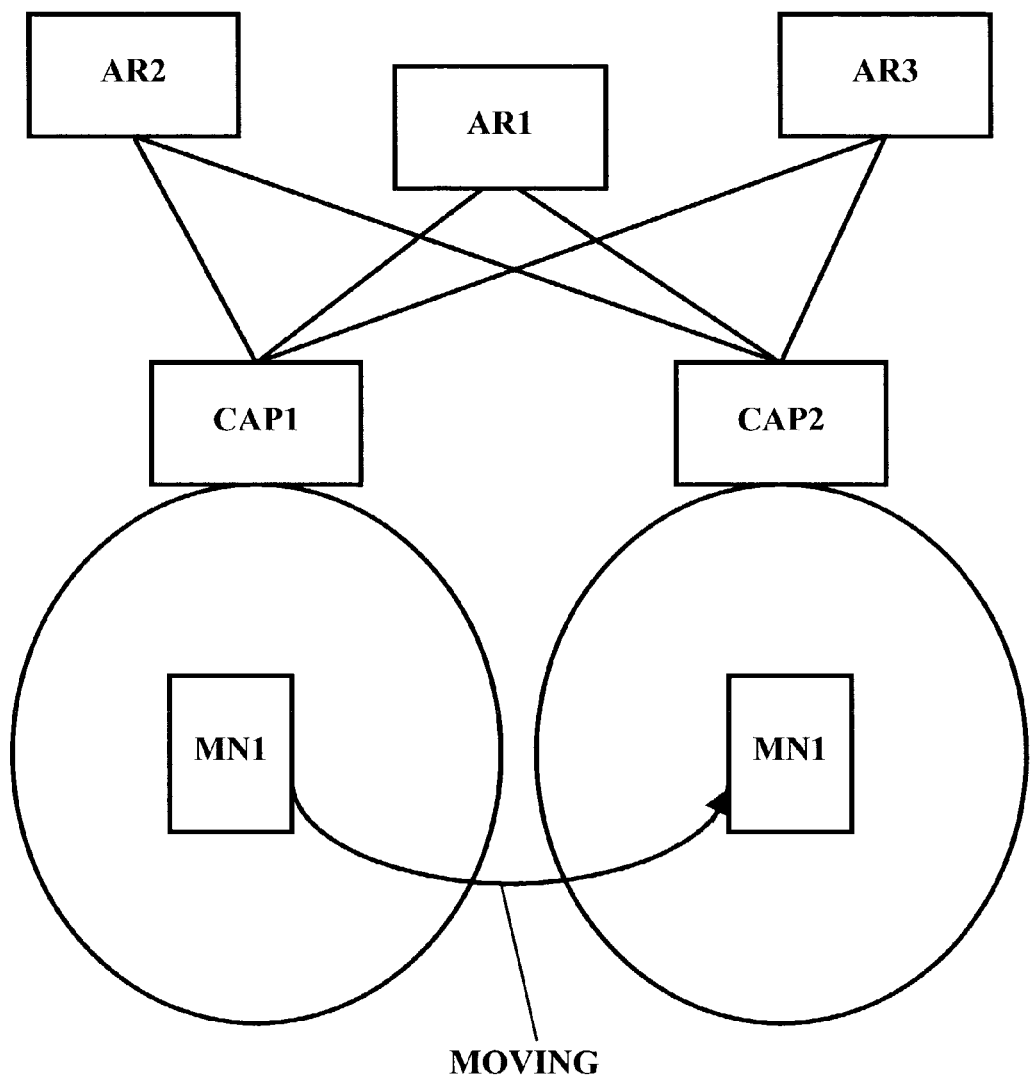
FIG. 6 shows a diagram as an example of connection possibilities between cellular access networks and access routers for illustrating an attachment procedure according to the prior art.

While the MN1 is, for example, L2 dormant, it moves from CAP1 to CAP2 (part of FIG. 4 above the dashed line). The MN1 provides the current network attachment (AR1 prefix) information to the new CAP2 while it is performing cell updates or URA updates. In other words, the network attachment information is transmitted to the CAP2 by means of a L2 message on the RRC level. The CAP2, which is also connected to AR1, is provided via an IPv6 signaling (L3) with the Router Advertisement (RtrAdv) of AR1, for example beforehand or in response to a Router Solicitation procedure, as described above. The CAP2 uses this information to determine it's own attachment to the AR1. That means, CAP2 verifies that it belongs to the same AR and hence does not provide any new L3 information. Thus MN1 retains the "old" L3 network attachment. If there is one, the CAP2 can ensure that the MN's L3 network reachability is current and doesn't need any updating. In other words, MN1 is now attached to CAP2 at the radio network level and to AR1 at the IP network level.

A similar procedure is performed when the L2 dormant MN1 "wakes up" in the same cell, e.g. due to a timer expiry, and sends a corresponding information element, such as a flag, to the CAP1 (as described in connection with steps S30 to S60 in FIG. 2). In other words, MN1 is now attached to CAP1 at the radio network level and to AR1 at the IP network level.

On the other hand, when the MN1 is L2 dormant and moves to CAP3 (part of FIG. 4 below the dashed line), the CAP3 uses the network attachment information (AR1 prefix) received with the L2 message to determine that the CAP3 belongs to a different AR, namely to AR2 which has provided its RtrAdv (and the AR2 prefix) to the CAP3 with a corresponding IPv6 signaling (L3), for example beforehand or in response to a Router Solicitation procedure, as described above. Thus, the CAP3 determines that the AR1 is not reachable for it and initialize the L3 attachment procedures (network attachment) by establishing a default Radio Bearer RB (on RRC level) to provide the latest L3 network information (RtrAdv of AR2). The MN1 obtains the new Router Advertisement, reconfigures a new CoA (AR2) and performs MIPv6 BU with its correspondent HA or MAP. In other words, MN1 is now attached to CAP3 at the radio network level and to AR2 at the IP network level.

Even though not described in FIG. 4, the determination of the network status (steps S55 and S105) may also be performed accordingly.

As described above, the attachment and update mechanism makes efficient use of MN power and radio resources by minimizing the need for constant IP, e.g. IPv6, Router Advertisement messaging and unnecessary and frequent MIPv6 binding updates. This is achieved by providing, when the MN moves from one CAP to another, the current ("old") network attachment (AR prefix) information to the new CAP during L2 update events like the cell updates or URA/RRA updates. The CAP uses this information to determine the CAP's attachment to the indicated AR. If there is one, the CAP can ensure that the MN's L3 network reachability is current and doesn't need any updating. That means, the CAP will simply perform L2 update procedures and allow the MN to be L2 dormant again. Only if there is none, i.e. the CAP belongs to a different AR, it initiates a default RB establishment to provide the latest L3 network information. Then, the MN obtains the new Router Advertisement, configures or computes a new CoA and performs MIPv6 Binding Updates.

For the transmission of the identification element, i.e. the previous (current) network attachment information, from the MN to the CAP, there can be realized different mechanisms. First mechanism is to use an existing L2 procedure (i.e. its signaling) and to add respective parameters, e.g. at the end of L2 updates over a Dedicated Control CHannel (DCCH) with a RRC Setup Complete message. Alternatively, an URA Update message can be used. As a second mechanism, a new L2 message separated from the existing ones may be used for informing, for example, about the network (AR) prefix.

By using a flag in the case of a periodic update in the same cell, the signaling data amount over air interfaces and/or the processing load (for example, comparison of AR prefixes) is further reduced and the CAP can ensure in a simple way that there is no need to send Router Advertisement to the MN at this time.

The attachment mechanism can be implemented, for example, by means of a corresponding computer program product, which is usable for data processing devices, such as the processor units of the MN and the CAP. It may comprise software code portions for performing the steps of the described mechanism when it is run on processor units. It is obvious that for this purpose the computer program product may comprise a medium (such as a CD-ROM, EEPROM), which stores respective software portions and is readable by respective input means connected to the processor units. Also, the computer program product may be directly loadable into an internal memory of the processor units. Preferably, the computer program product is configured such that the processor unit of the MN is adapted to perform necessary steps, such as the provision of the identification element (AR prefix) to the CAP and the recognition that no Router Advertisement is sent from the CAP (i.e. that the network attachment can be retained, and the processor unit of the CAP is adapted to perform necessary steps, such as the recognition of the identification element (in particular of the flag), checking/comparing of the received identification element and the stored identification element, the decision whether the Router Advertisement is to be sent to the MN or not.

The attachment/update procedure is not limited to the above described mechanism. There are a several modifications possible which are also intended to be covered. For example, it is possible to omit one or both of the network status determination staps S55 and/or S105 (and the respective following steps), thereby making it possible to send only the flag in step S50. Alternatively, the attachment/update procedure may be executed when the network status has changed, for example, when the network status is determined to be insufficient, irrespective of a location change or timer expiry. Moreover, the timer used for step S30 may not be reset after the attachment/update procedure, but running independently.

Furthermore, the cell/URA attachment may be first substantially completed before the network attachment related steps (i.e. checking whether the network attachment is still valid) are performed. Then, the identification element (AR prefix) may be sent, for example, in connection with a cell/URA update completion message.

Moreover, even though the above description is related to a cellular access network and access routers, it is obvious that the attachment and update mechanism can easily adapted to other wireless network system, for example to a WLAN.

As described above, for reducing IP level signaling and radio resource load during the attachment or update, e.g. L3 or IP attachment/update, of a mobile unit to a cellular wireless communication network, preferably an IPv6 based network, wherein access network elements and routing network elements are provided, an identification element is transmitted from the mobile unit to one of the access network elements. The identification element indicates a current attachment of the mobile unit to one of the routing network elements. The transmitted identification element is checked so as to determine whether the access network element is provided with a connection to the one routing network element. Furthermore, it is checked whether a network status still allows the usage of this routing network element by the mobile unit. If both of these criteria are fulfilled, the attachment or update procedure between the mobile unit and the access network element is completed while the attachment of the mobile unit to the routing network element is retained unaffected. This attachment is executable when the mobile unit moves from one cell area to another cell area, or when a network status concerning the attachment of the mobile unit has changed, or when a predetermined period of time is expired while the mobile unit remains in the same cell area.

It should be understood that the above description and accompanying figures are merely intended to illustrate the present invention by way of example only. The preferred embodiments of the present invention may thus vary within the scope of the attached claims.

What is claimed is:

1. A method of attaching/updating a mobile unit to a cellular wireless communication network, said cellular wireless communication network comprising:
   a plurality of access network elements, each of which covering a respective cell area in said cellular wireless communication network, wherein said mobile unit is attached to one of said plurality of access network elements by means of a L2 type connection; and
   a plurality of routing network elements (AR1, AR2) for forwarding data transmitted via said plurality of access network elements to and from said mobile unit, each of said routing network elements being connected with at least one of said plurality of access network elements, wherein said mobile unit is attached to one of said plurality of routing network elements by means of a L3 type connection,
   said method comprising the steps of
   initializing an attachment/update procedure of said mobile unit to one of said plurality of access network elements by means of a L2 type update procedure;
   transmitting from said mobile unit to said one of said plurality of access network elements a L3 type identification element indicating the existing attachment of said mobile unit to said one of said plurality of routing network elements; and
   checking said transmitted L3 type identification element for determining whether said one of said plurality of access network elements is provided with the connection to said one of said plurality of routing network elements to which the mobile unit has an existing attachment; and
   wherein in case that said one of said plurality of access network elements is provided with a connection to said one of said plurality of routing network elements to which the mobile unit has an existing attachment, the method comprises the step of completing the attachment/update procedure between said mobile unit and said one of said plurality of access network elements by means of executing the L2 type procedure and without executing a L3 type update procedure for an attachment of said mobile unit and the routing network elements.

2. A method according to claim 1, further comprising a step of measuring and determining whether a network status for the connection of the mobile unit to said one of said plurality of routing network elements is sufficient or not.

3. A method according to claim 2, wherein said step of initializing said attachment/update procedure is performed when the network status for the connection of said mobile unit to said one of said plurality of routing network elements is not sufficient.

4. A method according to claim 1, wherein said step of initializing said attachment/update procedure is performed when said mobile unit moves from one cell area to another cell area covered by said one of said plurality of access network elements.

5. A method according to claim 1, wherein said step of checking said transmitted L3 type identification element comprises a step of comparing said transmitted L3 type identification elements with identification elements of the routing network elements to which said one of said plurality of access network elements is connected.

6. A method according to claim 5, wherein, when said comparing steps results that said transmitted L3 type identification element and said identification elements of the routing network elements to which said one of said plurality of access network elements is connected match, said step of completing the attachment/update procedure between said mobile unit and said one of said plurality of access network elements is executed while the attachment of said mobile unit to said one of said routing network elements is retained unaffected.

7. A method according to claim 5, wherein, when said comparing steps results that said transmitted L3 type identification element and said identification elements of the routing network elements to which said one of said plurality of access network elements is connected match, said method comprises the steps of:
   measuring and determining whether a network status for the connection of the mobile unit to said one of said plurality of routing network elements is sufficient or not, and when said network status is sufficient; and
   said step of completing the attachment/update procedure between said mobile unit and said one of said plurality of access network elements is executed while the attachment of said mobile unit to said one of said routing network elements is retained unaffected.

8. A method according to claim 5, wherein, when said comparing steps results that said transmitted L3 type identification element and said identification elements of the routing network elements to which said one of said plurality of access network elements is connected match, said method comprises the steps of:
   measuring and determining whether a network status for the connection of the mobile unit to said one of said plurality of routing network elements is sufficient or not, and when said network status is not sufficient;
   establishing a radio bearer between said one of said plurality of access network elements and said mobile unit;
   providing said mobile unit with the L3 type identification element of another routing network element to which said one of said plurality of access network elements is connected;
   reconfiguring the attachment of said mobile unit to the new routing network element indicated by said provided L3 type identification element and performing a binding update procedure in said cellular wireless communication network;
   completing the attachment/update procedure between said mobile unit and said one of said plurality of access network elements and
   tearing down the radio bearer upon completion of the attachment/update procedure.

9. A method according to claim 1, wherein said L3 type identification element is transmitted from said mobile unit to said one of said plurality of access network elements by a location update procedure signaling.

10. A method according to claim 1, wherein said L3 type identification element is transmitted from said mobile unit to said one of said plurality of access network elements by a separate message when moving into the cell area of said one of said plurality of access network elements.

11. A method according to claim 1, wherein said step of initializing said attachment/update procedure is performed when a predetermined period of time is expired while said mobile unit remains in the same cell area.

12. A method according to claim 11, wherein said step of checking said transmitted L3 type identification element comprises the steps of:
  recognizing said transmitted L3 type identification element as an indication that said mobile unit is attached to one of said plurality of routing network elements to which said one of said plurality of access network elements is connected, wherein said step of completing the attachment/update procedure between said mobile unit and said one of said plurality of access network elements is executed while the attachment of said mobile unit to said one of said routing network elements is retained unaffected.

13. A method according to claim 11, wherein said step of checking said transmitted L3 type identification element comprises the steps of:
  recognizing said transmitted L3 type identification element as an indication that said mobile unit is attached to one of said plurality of routing network elements to which said one of said plurality of access network elements is connected; and
  measuring and determining whether a network status for the connection of the mobile unit to said one of said plurality of routing network elements is sufficient or not, and when said network status is sufficient, said step of completing the attachment/update procedure between said mobile unit and said one of said plurality of access network elements is executed while the attachment of said mobile unit to said one of said routing network elements is retained unaffected.

14. A method according to claim 11, wherein said step of checking said transmitted L3 type identification element comprises the steps of:
  recognizing said transmitted L3 type identification element as an indication that said mobile unit is attached to one of said plurality of routing network elements to which said one of said plurality of access network elements is connected;
  measuring and determining whether a network status for the connection of the mobile unit to said one of said plurality of routing network elements is sufficient or not, and when said network status is not sufficient;
  establishing a radio bearer between said one of said plurality of access network elements and said mobile unit;
  providing said mobile unit with the L3 type identification element of another routing network element to which said one of said plurality of access network elements is connected;
  reconfiguring the attachment of said mobile unit to the new routing network element indicated by said provided L3 type identification element and performing a binding update procedure in said cellular wireless communication network;
  completing the attachment/update procedure between said mobile unit and said one of said plurality of access network elements; and
  tearing down the radio bearer upon completion of the attachment/update procedure.

15. A method according to claim 11, wherein said transmitted L3 type identification element comprises a flag indicating that the attachment of said mobile unit to said one of said plurality of routing network elements is to be retained.

16. A system according to claim 11, wherein said system is usable for a one of L3 and IP attachment/updating.

17. A method according to claim 1, wherein said cellular wireless communication network is an IP based network, preferably an IPv6 based network, wherein said mobile unit is a mobile node, said access network elements are cellular access points, and said routing network elements are access routers.

18. A method according to claim 17 wherein said IP based network is an IPv6 based network.

19. A computer program product usable for data processing devices, comprising software code portions for performing the steps of claim 1 when said product is run on data processing devices in the wireless communication network.

20. A computer program product according to claim 19, wherein said computer program product comprises a medium readable by said data processing devices, on which said software code portions are stored.

21. A computer program product according to claim 19, wherein said computer program product is directly loadable into an internal memory of said data processing devices.

22. A computer program product according to claim 19, wherein said computer program product is executed by a data processing device of a mobile unit and a data processing device of an access network element.

23. A method according to claim 1, wherein said method is usable for one of L3 and IP attachment/updating.

24. A system for attaching/updating a mobile unit to a cellular wireless communication network, said cellular wireless communication network comprising:
  a plurality of access network elements, each of which covering a respective cell area in said cellular wireless communication network, wherein said mobile unit is attached to one of said plurality of access network elements by means of a L2 type connection; and
  a plurality of routing network elements for forwarding data transmitted via said plurality of access network elements to and from said mobile unit, each of said routing network elements being connected with at least one of said plurality of access network elements, wherein said mobile unit is attached to one of said plurality of routing network elements by means of an L3 type connection;
  said system comprising:
  means adapted to transmit, when an attachment/update procedure of said mobile unit to one of said plurality of access network elements is initialized by means of a L2 type update procedure, a L3 type identification element to said one of said plurality of access network elements, which L3 type identification element indicating the current attachment of said mobile unit to said one of said plurality of routing network elements; and
  means adapted to check said transmitted L3 type identification element so as to determine whether said one of said plurality of access network elements is provided with a connection to said one of said plurality of routing network elements to which the mobile unit has an existing attachment; and wherein
  in case that said one of said plurality of access network elements is provided with a connection to said one of said plurality of routing network elements to which the mobile unit has an existing attachment, the system is adapted to complete the attachment/update procedure between said mobile unit and said one of said plurality of access network elements by means of executing the L2 type procedure and without executing a L3 type update procedure for an attachment of said mobile unit and the routing network elements.

25. A system according to claim 24, further comprising means adapted to measure and determine whether a network status for the connection of the mobile unit to said one of said plurality of routing network elements is sufficient or not.

26. A system according to claim 25, wherein said attachment/update procedure is initialized when a network status for the connection of the mobile unit to said one of said plurality of routing network elements is determined to be not sufficient.

27. A system according to claim 24, wherein said attachment/update procedure is initialized when said mobile unit moves from one cell area to another cell area covered by said one of said plurality of access network elements.

28. A system according to claim 27, wherein said L3 type identification element is transmitted from said mobile unit to said one of said plurality of access network elements by a location update procedure signaling.

29. A system according to claim 27, wherein said L3 type identification element is transmitted from said mobile unit to said one of said plurality of access network elements by a separate message when moving into the cell area of said one of said plurality of access network elements.

30. A system according to claim 24, wherein said means adapted to check said transmitted L3 type identification element compares said transmitted L3 type identification element with identification elements of the routing network elements to which said one of said plurality of access network elements is connected.

31. A system according to claim 30, comprising means adapted to complete the attachment/update procedure between said mobile unit and said one of said plurality of access network elements and to retain the attachment of said mobile unit to said one of said routing network elements unaffected, when the comparison results that said transmitted L3 type identification element and said identification elements to which said one of said plurality of access network elements is connected match.

32. A system according to claim 30, comprising means adapted to measure and determine whether a network status for the connection of the mobile unit to said one of said plurality of routing network elements is sufficient or not; and
means adapted to complete the attachment/update procedure between said mobile unit and said one of said plurality of access network elements and to retain the attachment of said mobile unit to said one of said routing network elements unaffected, when the comparison results that said transmitted L3 type identification element and said identification elements to which said one of said plurality of access network elements is connected match and the determination results that said network status for the connection of the mobile unit to said one of said plurality of routing network elements is sufficient.

33. A system according to claim 30, comprising, when said comparison results that said transmitted L3 type identification element and said identification elements of the routing network elements to which said one of said plurality of access network elements is connected match;
means adapted to measure and determine whether a network status for the connection of the mobile unit to said one of said plurality of routing network elements is sufficient or not, and when the determination results that said network status for the connection of the mobile unit to said one of said plurality of routing network elements is not sufficient;
means adapted to establish a radio bearer between said one of said plurality of access network elements and said mobile unit;
means adapted to provide said mobile unit with the L3 type identification element of another routing network element to which said one of said plurality of access network elements is connected;
means adapted to reconfigure the attachment of said mobile unit to the new routing network element indicated by said provided L3 type identification element and to perform a binding update procedure in said cellular wireless communication network; and
means adapted to complete the attachment/update procedure between said mobile unit and said one of said plurality of access network elements and to tear down the radio bearer upon completion of the attachment/update procedure.

34. A system according to claim 24, wherein said attachment/update procedure is initialized when a predetermined period of time is expired while said mobile unit remains in the same cell area.

35. A system according to claim 34, wherein said means adapted to check said transmitted L3 type identification element is adapted to recognize said transmitted L3 type identification element as an indication that said mobile unit is attached to one of said plurality of routing network elements to which said one of said plurality of access network elements is connected, said system comprising:
means adapted to complete the attachment/update procedure between said mobile unit and said one of said plurality of access network elements and to retain the attachment of said mobile unit to said one of said routing network elements unaffected.

36. A system according to claim 34, wherein said means adapted to check said transmitted L3 type identification element is adapted to recognize said transmitted L3 type identification element as an indication that said mobile unit is attached to one of said plurality of routing network elements to which said one of said plurality of access network elements is connected, said system comprising:
means adapted to measure and determine whether a network status for the connection of the mobile unit to said one of said plurality of routing network elements is sufficient or not, and when the determination results that said network status for the connection of the mobile unit to said one of said plurality of routing network elements is sufficient; and
means adapted to complete the attachment/update procedure between said mobile unit and said one of said plurality of access network elements and to retain the attachment of said mobile unit to said one of said routing network elements unaffected.

37. A system according to claim 34, wherein said means adapted to check said transmitted L3 type identification element is adapted to recognize said transmitted L3 type identification element as an indication that said mobile unit is attached to one of said plurality of routing network elements to which said one of said plurality of access network elements is connected, said system further comprising:
means adapted to measure and determine whether a network status for the connection of the mobile unit to said one of said plurality of routing network elements is sufficient or not, and when the determination results that said network status for the connection of the mobile unit to said one of said plurality of routing network elements is not sufficient;

means adapted to establish a radio bearer between said one of said plurality of access network elements and said mobile unit;

means adapted to provide said mobile unit with the L3 type identification element of another routing network element to which said one of said plurality of access network elements is connected;

means adapted to reconfigure the attachment of said mobile unit to the new routing network element indicated by said provided L3 type identification element and to perform a binding update procedure in said cellular wireless communication network; and means adapted to complete the attachment/update procedure between said mobile unit and said one of said plurality of access network elements and to tear down the radio bearer upon completion of the attachment/update procedure.

38. A system according to claim 34, wherein said transmitted L3 type identification element comprises a flag indicating that the attachment of said mobile unit to said one of said plurality of routing network elements is to be retained.

39. A system according to claim 24, wherein said cellular wireless communication network is an IP based network, wherein said mobile unit is a mobile node, said access network elements are cellular access points, and said routing network elements are access routers.

40. A system according to claim 39, wherein the IP based network is an IPv6 based network.

41. An access network element according to claim 40, wherein said cellular wireless communication network is an IP based network, wherein said mobile unit is a mobile node, said access network element is a cellular access point, and said routing network elements are access routers.

42. An access network element acceding to claim 41 wherein the cellular wireless network is an IPv6 network.

43. A mobile unit attachable to a cellular wireless communication network, said cellular wireless communication network comprising:

a plurality of access network elements, each of which covering a respective cell area in said cellular wireless communication network, wherein said mobile unit is attached to one of said plurality of access network elements by means of a L2 type connection; and a plurality of routing network elements for forwarding data transmitted via said plurality of access network elements to and from said mobile unit, each of said routing network elements being connected with at least one of said plurality of access network elements, wherein said mobile unit is attached to one of said plurality of routing network elements by means of a L3 type connection, said mobile unit comprising:

means adapted to transmit, when an attachment/update procedure of said mobile unit to one of said plurality of access network elements is initialized by means of a L2 type update procedure, a L3 type identification element to said one of said plurality of access network elements, which L3 type identification element indicating the current attachment of said mobile unit to said one of said plurality of routing network elements to which the mobile unit has an existing attachment; and wherein in a case that said one of said plurality of access network elements is provided with a connection to said one of said plurality of routing network elements to which the mobile unit has an existing attachment, the attachment/update procedure between said mobile unit and said one of said plurality of access network elements is completed by means of executing the L2 type procedure and without executing a L3 type update procedure for an attachment of said mobile unit and the routing network elements.

44. A mobile unit according to claim 43, wherein said attachment/update procedure is initialized when said mobile unit moves from one cell area to another cell area covered by said one of said plurality of access network elements.

45. A mobile unit according to claim 43, wherein said attachment/update procedure is initialized when a determination is made that a network status for the connection of the mobile unit to said one of said plurality of routing network elements is not sufficient.

46. A mobile unit according to claim 43, said mobile unit being adapted to reconfigure the attachment of said mobile unit to a new routing network element to which said one of said plurality of access network elements is connected, indicated by a provided L3 type identification element, and to perform a binding update procedure in said cellular wireless communication network.

47. A mobile unit according to claim 43, wherein said L3 type identification element is transmitted from said mobile unit to said one of said plurality of access network elements by a location update procedure signaling.

48. A mobile unit according to claim 43, wherein said L3 type identification element is transmitted from said mobile unit to said one of said plurality of access network elements by a separate message when moving into the cell area of said one of said plurality of access network elements.

49. A mobile unit according to claim 43, wherein said attachment/update procedure is initialized when a predetermined period of time is expired while said mobile unit remains in the same cell area.

50. A mobile unit according to claim 49, wherein said transmitted L3 type identification element comprises a flag indicating that the attachment of said mobile unit to said one of said plurality of routing network elements is to be retained.

51. A mobile unit according to claim 43, wherein said cellular wireless communication network is an IP based network, wherein said mobile unit is a mobile node, said access network elements are cellular access points, and said routing network elements are access routers.

52. A mobile unit according to claim 51, wherein the IP based network is an IPv6 based network.

53. An access network element of a cellular wireless communication network to which a mobile unit is attachable, said cellular wireless communication network comprising:

a plurality of access network elements, each of which covering a respective cell area in said cellular wireless communication network, wherein said mobile unit is attached to one of said plurality of access network elements by means of a L2 type connection; and a plurality of routing network elements for forwarding data transmitted via said plurality of access network elements to and from said mobile unit, each of said routing network elements being connected with at least one of said plurality of access network elements, wherein said mobile unit is attached to one of said plurality of routing network elements by means of a L3 type connection;

said access network element comprising: means adapted to check, when an attachment/update procedure of said mobile unit to said network element is initialized by means of a L2 type update procedure, a L3 type identification element transmitted from said mobile unit to said access network element, which L3 type identification element indicating the current attachment of said mobile unit to said one of said plurality of routing network elements, wherein a determination is made whether said access network element is provided with a connection to said one of said plurality of routing network elements to which the mobile unit has an existing attachment;

wherein in a case that said one of said plurality of access network elements is provided with a connection to said one of said plurality of routing network elements to which the mobile unit has an existing attachment, the access network element is adapted to complete the attachment/update procedure between said mobile unit and said one of said plurality of access network elements by means of executing the L2 type procedure and without executing a L3 type update procedure for an attachment of said mobile unit and the routing network elements.

54. An access network element according to claim 53, further comprising means adapted to measure and determine whether a network status for the connection of the mobile unit to said one of said plurality of routing network elements is sufficient or not.

55. An access network element according to claim 54, wherein said attachment/update procedure is initialized when the network status for the connection of the mobile unit to said one of said plurality of routing network elements is determined to be not sufficient.

56. An access network element according to claim 55, further comprising means adapted to complete the attachment/update procedure between said mobile unit and said one of said access network elements and to retain the attachment of said mobile unit to said one of said routing network elements unaffected, when the comparison results that said transmitted L3 type identification element and said identification elements to which said access network element is connected match.

57. An access network element according to claim 53, wherein said attachment/update procedure is initialized when said mobile unit moves from one cell area to another cell area covered by said access network element.

58. An access network element according to claim 53, wherein said means adapted to check said transmitted L3 type identification element compare said transmitted L3 type identification element with identification elements of the routing network elements to which said access network element is connected.

59. An access network element according to claim 58, further comprising:
means adapted to measure and determine whether a network status for the connection of the mobile unit to said one of said plurality of routing network elements is sufficient or not; and
means adapted to complete the attachment/update procedure between said mobile unit and said one of said plurality of access network elements and to retain the attachment of said mobile unit to said one of said routing network elements unaffected, when the comparison results that said transmitted L3 type identification element and said identification elements to which said one of said plurality of access network elements is connected match and the determination results that said network status for the connection of the mobile unit to said one of said plurality of routing network elements is sufficient.

60. An access network element according to 58, comprising, when said comparison results that said transmitted L3 type identification element and said registered identification element match,
means adapted to measure and determine whether a network status for the connection of the mobile unit to said one of said plurality of routing network elements is sufficient or not, and when the determination results that said network status for the connection of the mobile unit to said one of said plurality of routing network elements is not sufficient;
means adapted to establish a radio bearer between said access network element and said mobile unit;
means adapted to provide said mobile unit with the L3 type identification element of another routing network element to which said access network element is connected; and
means adapted to tear down the radio bearer upon completion of the attachment/update procedure.

61. An access network element according to claim 53, wherein said L3 type identification element is transmitted from said mobile unit to said access network element by a location update procedure signaling.

62. An access network element according to claim 53, wherein said L3 type identification element is transmitted from said mobile unit to said access network element by a separate message when moving into the cell area of said access network element.

63. An access network element according to claim 53, wherein said attachment/update procedure is initialized when a predetermined period of time is expired while said mobile unit remains in the same cell area.

64. An access network element according to claim 63, wherein said means adapted to check said transmitted L3 type identification element is adapted to recognize said transmitted L3 type identification element as an indication that said mobile unit is attached to one of said plurality of routing network elements to which said access network element is connected, said access network element comprising means adapted to complete the attachment/update procedure between said mobile unit and said access network element and to retain the attachment of said mobile unit to said one of said routing network elements unaffected.

65. An access network element according to claim 63, wherein said means adapted to check said transmitted L3 type identification element is adapted to recognize said transmitted L3 type identification element as an indication that said mobile unit is attached to one of said plurality of routing network elements to which said access network element is connected, said access network element further comprising:
means adapted to measure and determine whether a network status for the connection of the mobile unit to said one of said plurality of routing network elements is sufficient or not, and when the determination results that said network status for the connection of the mobile unit to said one of said plurality of routing network elements is sufficient; and
means adapted to complete the attachment/update procedure between said mobile unit and said access network element and to retain the attachment of said mobile unit to said one of said routing network elements unaffected.

66. An access network element according to claim 63, wherein said means adapted to check said transmitted L3 type identification element is adapted to recognize said transmitted L3 type identification element as an indication that said mobile unit is attached to one of said plurality of routing network elements to which said access network element is connected, said access network element comprising:

means adapted to measure and determine whether a network status for the connection of the mobile unit to said one of said plurality of routing network elements is sufficient or not, and when the determination results that said network status for the connection of the mobile unit to said one of said plurality of routing network elements is not sufficient;

means adapted to establish a radio bearer between said access network element and said mobile unit;

means adapted to provide said mobile unit with the L3 type identification element of another routing network element to which said access network element is connected, and means adapted to tear down the radio bearer upon completion of the attachment/update procedure.

67. An access network element according to claim 63, wherein said transmitted L3 type identification element comprises a flag indicating that the attachment of said mobile unit to said one of said plurality of routing network elements is to be retained.

68. An access network element according to claim 53, wherein said access network element is used in one of a L3 and IP attachment/updating.

\* \* \* \* \*